US010928640B2

(12) United States Patent
Sun et al.

(10) Patent No.: US 10,928,640 B2
(45) Date of Patent: Feb. 23, 2021

(54) OPTICAL SYSTEM FOR ASSISTING IMAGE POSITIONING

(71) Applicants: HUANIC CORPORATION, Shaanxi (CN); Jianhua Sun, Shaanxi (CN)

(72) Inventors: Jianhua Sun, Shaanxi (CN); Yanpeng Song, Shaanxi (CN); Yingzi Yang, Shaanxi (CN)

(73) Assignees: HUANIC CORPORATION, Shaanxi (CN); Jianhua Sun, Shaanxi (CN)

( * ) Notice: Subject to any disclaimer, the term of this patent is extended or adjusted under 35 U.S.C. 154(b) by 364 days.

(21) Appl. No.: 15/765,123

(22) PCT Filed: Sep. 30, 2016

(86) PCT No.: PCT/CN2016/101127
§ 371 (c)(1),
(2) Date: Jul. 24, 2018

(87) PCT Pub. No.: WO2017/054769
PCT Pub. Date: Apr. 6, 2017

(65) Prior Publication Data
US 2018/0329218 A1    Nov. 15, 2018

(30) Foreign Application Priority Data

Sep. 30, 2015 (CN) .......................... 201520767430.6
Oct. 27, 2015 (CN) .......................... 201520836596.9

(51) Int. Cl.
F21V 11/00    (2015.01)
G02B 27/18   (2006.01)
(Continued)

(52) U.S. Cl.
CPC .............. G02B 27/18 (2013.01); G01B 11/25 (2013.01); G02B 5/04 (2013.01); G02B 13/18 (2013.01); G02B 27/20 (2013.01); G02B 27/34 (2013.01)

(58) Field of Classification Search
CPC ........ G02B 27/18; G02B 27/34; G02B 27/20; G02B 5/04; G02B 13/18; G01B 11/25
(Continued)

(56) References Cited

U.S. PATENT DOCUMENTS 7,136,233 B2 * 11/2006 Dang ..................... G01C 15/00
                                                                359/710
9,303,990 B2 *  4/2016 Bascom ............... G01C 15/002
9,891,051 B2 *  2/2018 Zimmermann ........ G01B 11/26

FOREIGN PATENT DOCUMENTS

CN          2419576 Y      2/2001
CN        102362151 A     2/2012
(Continued)

OTHER PUBLICATIONS

Communication Supplementary European Search Report dated Jul. 12, 2019 in connection with European Patent Application Serial No. 16850393.6.
(Continued)

*Primary Examiner* — Ali Alavi
(74) *Attorney, Agent, or Firm* — Amster, Rothstein & Ebenstein LLP

(57) ABSTRACT

An optical system for assisting image positioning. The system comprises a light source (1), and further comprises a dot pattern or an interface beam-splitting pattern which is arranged on a light-emergent light path of the light source (1) and generates an interface beam-splitting projection light ray for indicating a text or an image after being projected by emergent light of the light source (1). By means of a combination of a light source (1) and a dot pattern or an
(Continued)

interface beam-splitting pattern, a word line, a cross line, or the other patterns which can generate a beam-splitting interface can be projected. Furthermore, by virtue of a DOE moulding lens, of which an emergent face is a spherical face or an aspherical face, a specific linear light beam or the other patterns which can generate the beam-splitting interface are generated.

16 Claims, 4 Drawing Sheets

(51) Int. Cl.
  *G02B 27/34* (2006.01)
  *G02B 27/20* (2006.01)
  *G01B 11/25* (2006.01)
  *G02B 5/04* (2006.01)
  *G02B 13/18* (2006.01)

(58) Field of Classification Search
  USPC .......................................................... 362/351
  See application file for complete search history.

(56) References Cited

FOREIGN PATENT DOCUMENTS

| | | | |
|---|---|---|---|
| CN | 203520407 U | | 4/2014 |
| CN | 104 076 417 A | | 10/2014 |
| CN | 203949640 U | * | 11/2014 |
| CN | 203949640 U | | 11/2014 |
| CN | 204 420 727 U | | 6/2015 |
| CN | 204420727 | * | 6/2015 |
| CN | 205027355 U | | 2/2016 |
| CN | 205121067 U | | 3/2016 |

OTHER PUBLICATIONS

International Search Report of PCT/CN2016/101127 dated Dec. 1, 2016.

* cited by examiner

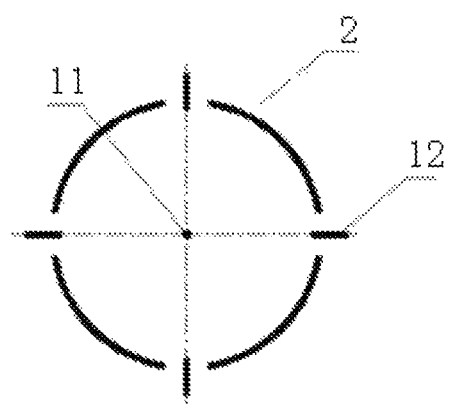
Fig. 1A
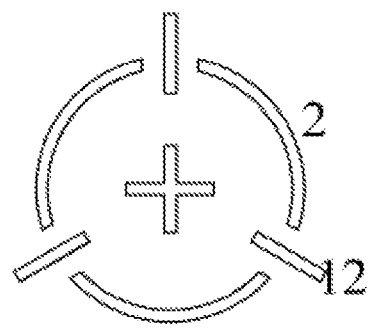
Fig. 1B
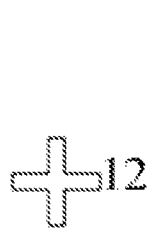
Fig. 1C
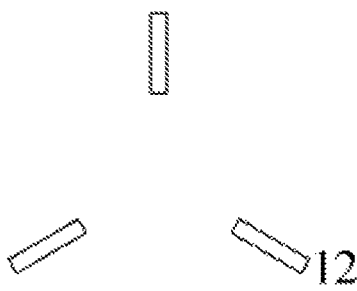
Fig. 1D
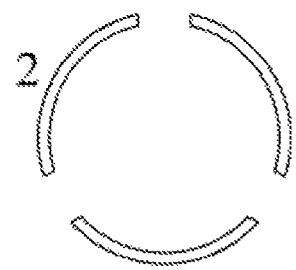
Fig. 1E
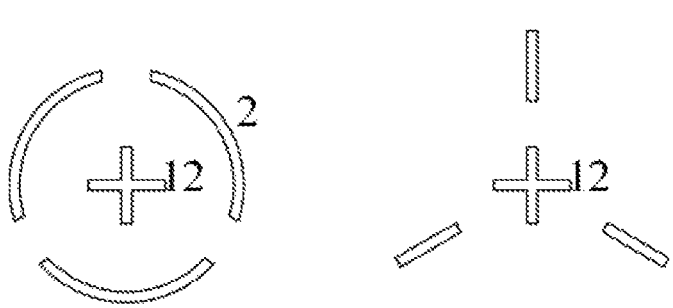
Fig. 1F
Fig. 1G
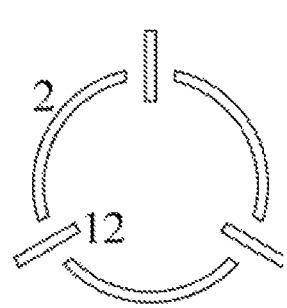
Fig. 1H

OPTICAL SYSTEM FOR ASSISTING IMAGE POSITIONING

CROSS-REFERENCE TO RELATED APPLICATIONS

This application is a national application of PCT/CN2016/101127, filed on Sep. 30, 2016, and claims priorities to Chinese Application No. 201520836596.9 filed on Oct. 27, 2015 and Chinese Application No. 201520767430.6, filed on Sep. 30, 2015, the entire contents thereof are incorporated herein by reference.

TECHNICAL FIELD

The present disclosure relates to optoelectronic technology, particularly to accurately locate and capture images or texts with LEDs or lasers, and more particularly, to an optical system for assisting image positioning.

BACKGROUND

At present, various smart mobile terminals have become very popular, and one of their main functions is to take pictures and videos, with high definition and excellent shockproof effects. The only deficiency is that whether it is a smart phone, a tablet or a learning machine, positioning and capturing of an image or a text when taking photos or videos, are performed by illuminating the device to illuminate the image that needs to be captured, and then capturing the illuminated image through the camera. Since such a method of positioning and capturing the image utilizes a common light source and have no pattern that can assist in generating a beam splitting interface, the direction of emergent light cannot be controlled accurately. Therefore, there is a need in the art for an optical system that can accurately and rapidly position and capture a specific image or text.

SUMMARY

The objective of the present disclosure is to overcome the problem that the image positioning, capturing unit or function on the existing smart terminal cannot achieve accurate positioning and capturing of a specific part of an image or a specific image or text.

In view of this, the present disclosure provides an optical system for assisting image positioning, including a light source, characterized by further including a dot-shaped pattern or an interface beam splitting pattern provided on an light emergent optical path of the light source, wherein the dot-shaped pattern or the interface beam splitting pattern is projected by the emitted light of the light source to generate an interface beam splitting projected light for aiming at characters or images.

The light source is an LED light source, and the dot-shaped pattern or the interface beam splitting pattern is provided on the LED light source.

The interface beam splitting pattern is a straight line or a cross line provided on the LED light source, to produce a straight line or a cross line pattern projected on the target.

The interface beam splitting pattern is formed by combining a plurality of segmented LED light sources.

The light source is one LED that generates a dot-shaped pattern, or is formed by a combination of two or more segmented LED light sources, or is one OLED.

A lens or a lens set is arranged on the light emergent optical path of the LED light source, and the lens is an aspheric lens or a spherical lens.

The lens set includes a beam expander lens, a focusing lens and a collimating lens transparent element disposed sequentially in a direction away from the LED light source.

The lens set is composed of a spherical lens and an aspheric lens.

The light source is a laser module, and the dot-shaped pattern or the interface beam splitting pattern is provided on a transparent element, and the transparent element is disposed in the light emergent optical path of the laser module.

An aspheric lens and a reflective element configured to reflect a laser passing through the aspheric lens to the transparent element are disposed between the laser module and the transparent element), on the light emergent optical path of the laser module.

The transparent element is a DOE (Diffractive Optical Element) lens or a wave-shaped lens.

The light incident surface of the DOE lens is provided with a light receiving pattern for generating a straight line or a cross line of laser, and the light emergent surface of the DOE lens is a spherical or aspheric surface.

The present disclosure will be described in detail below with reference to the accompanying drawings and embodiments.

BRIEF DESCRIPTION OF THE DRAWINGS

FIGS. 1A to 1H are schematic diagrams of exemplary light sources according to the present disclosure.

REFERENCE NUMERALS

1: light source; 2: segmented LED light source; 3: beam expander lens; 4: focusing lens; 5: collimating lens transparent element; 6: laser module; 7: transparent element; 8: aspheric lens; 9: reflective element; 10: lens or lens set; 11: point light source; 12: strip-shaped light source; 13: first housing; 14: LED chip; 15: second housing.

DETAILED DESCRIPTION

In order to overcome the problem that the image positioning-capturing unit or the function of the existing intelligent terminal cannot realize precise positioning and capturing of a specific part of an image or a text, the present embodiment provide an optical system for assisting image positioning, including a light source 1 and a dot-shaped pattern or an interface beam splitting pattern provided in the light emergent optical path of the light source 1, which are projected by the emitted light of the light source 1 to generate interface splitting beam projection light for aiming at a text or an image. With the projected beam splitting interface pattern, it is possible to capture and position a specific object such as a character, a figure, or a pattern, and provide security and convenience for the subsequent captured and videoed object.

At present, a common light source may be an LED light source or a laser light source. When the selected light source is an LED light source, the dot-shaped pattern or interface beam splitting pattern mentioned herein is provided on the LED light source, which can greatly reduce the size and facilitate miniaturization.

First Embodiment

When the light source is an LED light source, the interface beam splitting pattern is a dot-shaped pattern, a straight line, a cross line, or other pattern provided on the LED light source that emits light to produces a spot-shaped light spot or light of a straight line shape or a cross line shape or of other pattern after passing through a spherical or aspheric lens. It is also possible that an OLED light source images through the lens or the lens set 10 to achieve the indication or positioning of the picture or image.

Figure 2:
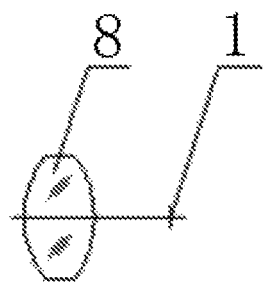
FIG. 2 is a schematic diagram of an optical path system composed of an LED light source with a beam splitting interface pattern and an aspheric lens.
Figure 3:
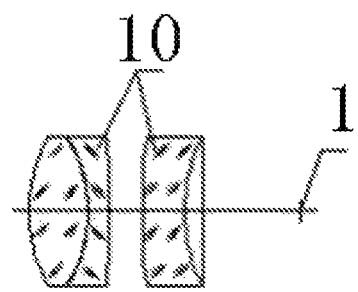
FIG. 3 is a schematic diagram of an optical path system composed of an LED light source with a beam splitting interface pattern and a lens.
Figure 4:
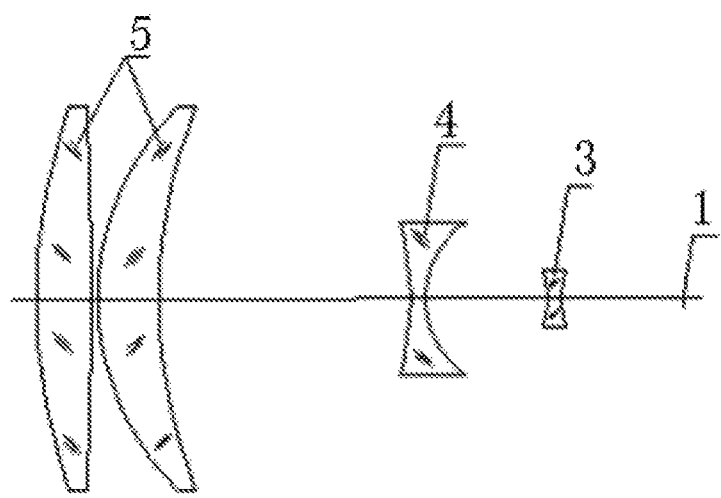
FIG. 4 is a schematic diagram of an optical path system composed of an LED light source with a beam splitting interface pattern and a lens set.

It should be noted that the light source 1 may be an LED, or may be a combination of two or more segmented LED light sources 2, or may be one OLED, or may be a combination of them. The light source 1 can display different patterns under the control of a circuit, to produce spot-shaped light spot or interface beam splitting projected light or other patterns. When the entire optical system is composed of only the light source 1 and the aspheric lens 8 shown in FIG. 2, the length of the optical system is larger than or equal to 1 mm and smaller than or equal to 10 mm. When the optical system is composed of the light source 1 and the spherical lens or lens set 10 as shown in FIG. 3, the length of the optical system (corresponding to the length of the formed device) is larger than or equal to 10 mm and smaller than or equal to 100 mm. When the optical system is composed of the light source 1 and the lens set (which can be composed of a spherical lens and an aspheric lens) as shown in FIG. 4, the length of the device formed by the optical system is greater than 100 mm, and the lens set includes a beam expander lens 3, a focusing lens 4 and a collimating lens transparent element 5 disposed sequentially in a direction away from the light source 1.

As an example, the light source 1 may be composed of a plurality of LED light sources. As shown in FIG. 1A, the light source 1 may include a point light source 11 at the center of a circle, a plurality of segmented LED light sources 2, and strip-shaped light sources 12 disposed along the circumference at equal intervals. In this way, a crosshair pattern for aiming at the target will be projected by the light source 1 as shown in FIG. 1A. FIGS. 1B to 1H illustrate other examples of possible structure of the light source 1. As can be seen from the FIGS. 1A to 1H, each of the segmented LED light sources 2 may have a curved shape and the plurality of segmented LED light sources 2 may form a circle shape. It should be understood that the above examples are only provided to facilitate understanding the present disclosure, and the light source 1 is not limited thereto.

Figure 7A:
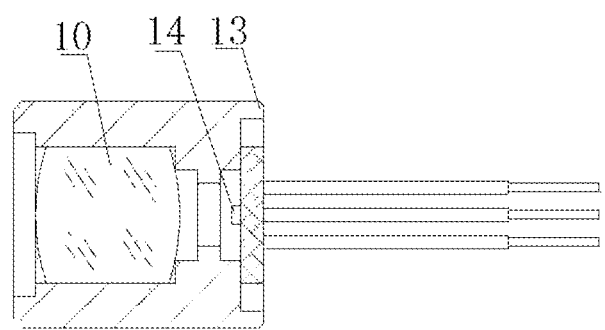
FIG. 7A is a structural schematic diagram of an LED light source module having an interface beam splitting pattern.
Figure 7B:
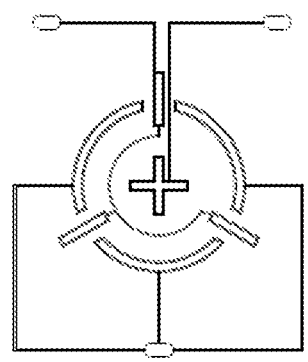
FIG. 7B shows an exemplary LED chip according to the present disclosure.
Figure 8:
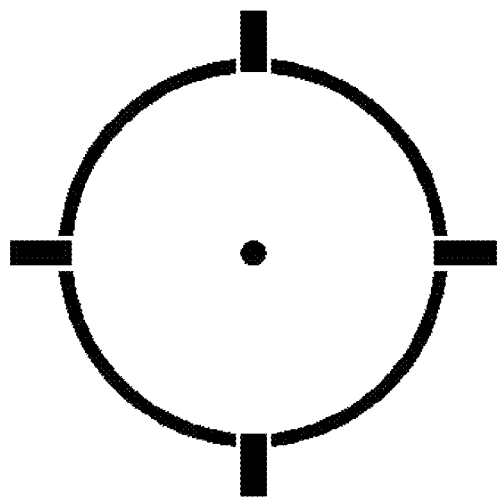
FIG. 8 is a schematic diagram of an interface beam splitting pattern projected by the LED light source module shown in FIG. 7.

FIG. 7A is a schematic diagram of an LED light source that can generate an interface beam splitting pattern, and is mainly composed of an LED chip 14 mounted on a rear end of a first housing 13 and a lens 10 mounted inside the first housing 13 and placed on the light emergent optical path of the LED chip 14 (as shown in FIG. 7B), so that it can be assembled into an optical device that can be mass-produced and applied to produce an interface beam splitting pattern. FIG. 7B illustrates an exemplary diagram of the LED chip 14. The beam splitting interface pattern (i.e., the interface beam splitting pattern) provided on the LED chip 14 is shown in FIG. 8. After light passes through the lens 10, the interface splitting pattern shown in FIG. 8 can be projected on the object to be captured, thus achieving pre-positioning on the object to be captured.

With the above various combined optical paths, the optical system provided with projectable graphic identification is composed only of a light source having an interface beam splitting pattern, a lens, or a lens set. Such an optical system is advantageous in small size, and the entire module can be minimized, and pointing, capturing, positioning, measuring, or interface splitting and other functions can be completed quickly.

Second Embodiment

Figure 5:
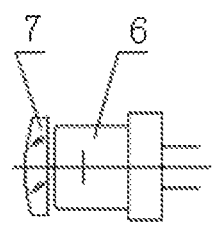
FIG. 5 is a schematic diagram of an optical system for assisting image positioning.

When the laser module 6 takes laser as illumination, a dot-shaped pattern or interface beam splitting pattern is provided on a transparent element 7 shown in FIG. 5. The transparent element 7 is disposed in the light emergent optical path from the laser module 6.

The transparent element 7 may be a DOE lens, such as, a wave-shaped lens. The first surface (the light incident surface or the laser light incident surface) of the transparent element 7 can generate a straight line pattern, a cross line pattern, or other pattern. The second surface (the light emergent surface or the laser light exiting surface) is a spherical or aspheric surface that images the pattern produced by the first surface at a limited distance or an infinite distance.

The laser beam emitted from the laser module 6 employed in the optical system for assisting image positioning shown in FIG. 5 is a laser having a wavelength of 380 to 980 nm, and the distance between the transparent element 7 and the laser module 6 is 0 to 15 mm. The thickness of the light-transmitting element 7 is 0.1 to 10 mm, which is suitable for a relatively simple image positioning and capturing system.

Figure 6:
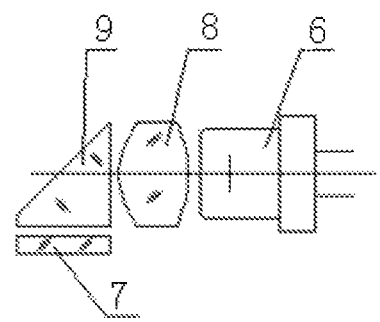
FIG. 6 is a schematic diagram of an optical system for assisting image positioning with optical components.

In order to obtain better image positioning effect or to adapt to the installation of the optical system of different devices, this embodiment provides an optical system for assisting image positioning shown in FIG. 6, including a laser module 6. An aspheric lens 8 and a reflective element 9 configured to reflect a laser passing through the aspheric lens 8 to the transparent element 7 are disposed between the laser module 6 and the transparent element 7, on the light emergent optical path of the laser module 6. The transparent element 7 is also a DOE lens or a wave-shaped lens. The first surface (the light incident surface or the laser light incident surface) of the transparent element 7 can generate a straight line pattern, a cross line pattern, or other pattern. The second surface (the light emergent surface or the laser light exiting surface) is a spherical or aspheric surface that images the pattern produced by the first surface at a limited distance or an infinite distance. The laser module 6 and the aspheric lens 8 constitute a light source module, and the focal length of the light source module 6 is larger than or equal to 1 mm, up to infinity.

The distance between the aspheric lens 8 and the laser module 6 may be within a range from 0 to 10 mm, the outer diameter of the aspheric lens 8 may be within a range from 1 to 10 mm. The aspheric lens 8 may be a flat-aspheric surface lens (i.e., a first surface thereof is a flat surface, and a second surface opposite to the first surface is an aspheric surface) or a double aspheric surface lens (i.e., each of the first surface and the second surface opposite to the first surface is an aspheric surface).

The reflective element 9 is an isosceles right-angle prism, and the light emitted from the light source module 6 is incident on a right-angle surface of the isosceles right-angle prism, and a total reflection is generated on the slope surface. The direction of the light is turned 90 degrees and then emitted from another right-angle surface. After passing through the transparent element 7, the pattern with a beam splitting interface (such as a straight line, or a cross line and so on) is projected onto the image or a specific part of the image, thus achieving quick positioning and capturing of the image or the specific part of the image.

Figure 9:
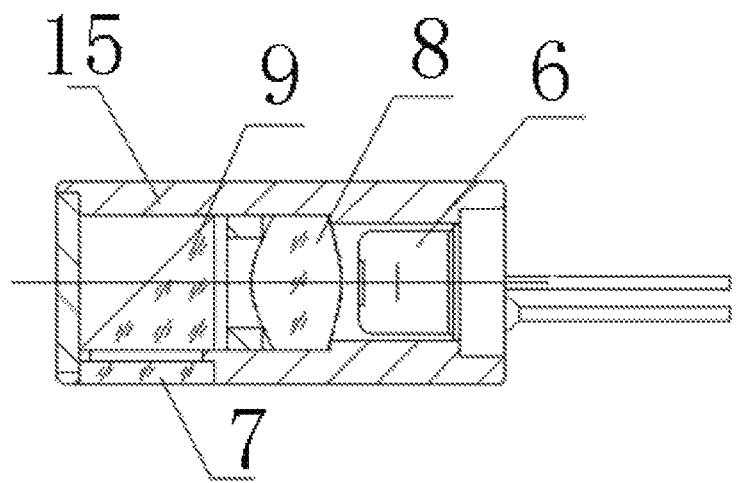
FIG. 9 is a schematic diagram of a system for assisting image positioning when a laser module serves as a light source.

The distance between the aspheric lens 8 and the right-angle isosceles prism may range from 0 to 10 mm, and the size of the isosceles right-angle prism may range from 1×1×1 mm to 10×10×10 mm. The light emitted from the right-angle isosceles prism passes through a DOE lens or a wave-shaped lens or other lens of different materials that can generate a beam splitting interface, i.e., the transparent element 7, which can form a straight line, a cross line or other pattern with a beam splitting interface. The distance between the isosceles prism and the DOE lens or the wave-shaped lens or the lens of other materials that can produce the beam splitting interface is in the range of 0 to 10 mm. The DOE lens or the wave-shaped lens or the lens of other materials that can produce the beam splitting interface has a thickness within a range from 0.1 to 10 mm with a shape of a square or a circle. As shown in FIG. 9, the an optical system for assisting image positioning shown in FIG. 6 is fixedly integrated in a second housing 15 and has a compact structure and is very convenient to carry and use.

The invention claimed is:

1. An optical system for assisting image positioning, comprising a light source (1), characterized by a dot-shaped pattern or an interface beam splitting pattern provided on the light source (1), wherein the dot-shaped pattern or the interface beam splitting pattern is projected by emergent light emitted from the light source (1) to generate interface beam splitting projected light for aiming at characters or images, wherein the interface beam splitting pattern is formed by combining a plurality of segmented LED light sources (2).

2. The optical system for assisting image positioning according to claim 1, wherein the light source (1) comprises an LED light source, which provides the dot-shaped pattern on the LED light source.

3. The optical system for assisting image positioning according to claim 2, wherein the light source (1) further comprises at least one strip light source and a plurality of segmented LED light sources (2), and wherein the plurality of segmented LED light sources (2) are arranged in a circle shape and the at least one strip light source is arranged in a straight line or a cross line or a combination of straight lines and a cross line, and the plurality of segmented LED light sources (2) are arranged in a circle shape.

4. The optical system for assisting image positioning according to claim 2, wherein the light source (1) is one OLED.

5. The optical system for assisting image positioning according to claim 1, wherein the light source (1) comprises at least one strip light source, and the at least one strip light source is arranged in a straight line or a cross line or a combination of straight lines and a cross line.

6. The optical system for assisting image positioning according to claim 5, wherein the interface beam splitting pattern is a straight line or a cross line provided on the LED light source, to produce a straight line or a cross line after being projected by an exiting light from the light source (1).

7. The optical system for assisting image positioning according to claim 5, wherein the light source (1) further comprises a plurality of segmented LED light sources (2), and the plurality of segmented LED light sources (2) are arranged in a circle shape.

8. The optical system for assisting image positioning according to claim 1, wherein the light source (1) comprises a plurality of segmented LED light sources (2), and the plurality of segmented LED light sources (2) are arranged in a circle shape.

9. The optical system for assisting image positioning according to claim 1, wherein a lens or a lens set (10) is arranged on the light emergent optical path of the LED light source, and the lens is an aspheric lens or a spherical lens.

10. The optical system for assisting image positioning according to claim 9, wherein the lens set (10) comprises a beam expander lens (3), a focusing lens (4) and a collimating lens transparent element (5) disposed sequentially in a direction away from the LED light source.

11. The optical system for assisting image positioning according to claim 9, wherein the lens set is composed of a spherical lens and an aspheric lens.

12. An optical system for assisting image positioning, comprising a light source (1), characterized by further comprising a dot-shaped pattern or an interface beam splitting pattern provided in a light emergent optical path of the light source (1), wherein the dot-shaped pattern or the interface beam splitting pattern is projected by emergent light emitted from the light source (1) to generate interface beam splitting projected light for aiming at characters or images, wherein the light source (1) is a laser module (6), and the dot-shaped pattern or the interface beam splitting pattern is provided on a transparent element (7), and the transparent element (7) is disposed in the light emergent optical path of the laser module (6).

13. The optical system for assisting image positioning according to claim 12, wherein an aspheric lens (8) and a reflective element (9) configured to reflect a laser passing through the aspheric lens (8) to the transparent element (7) are disposed between the laser module (1) and the transparent element (7), on the light emergent optical path of the laser module (6).

14. The optical system for assisting image positioning according to claim 13, wherein the transparent element (7) is a DOE lens.

15. The optical system for assisting image positioning according to claim 14, wherein the DOE lens is a wave-shaped lens.

16. The optical system for assisting image positioning according to claim 15, wherein the light incident surface of the DOE lens is provided with a light receiving pattern for generating a straight line or a cross line of laser, and the light emergent surface of the DOE lens is a spherical or aspheric surface.

\* \* \* \* \*